(No Model.)
F. M. SHAW.
GRAIN CLEANER.
No. 450,198. Patented Apr. 14, 1891.
2 Sheets—Sheet 2.
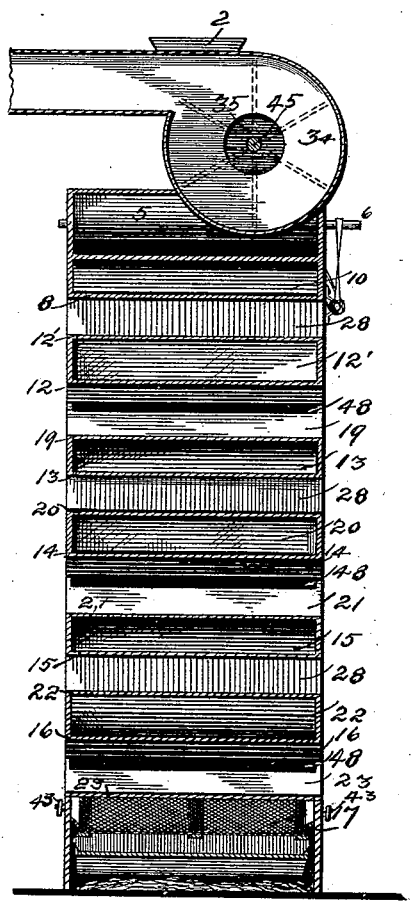
Fig. 5.
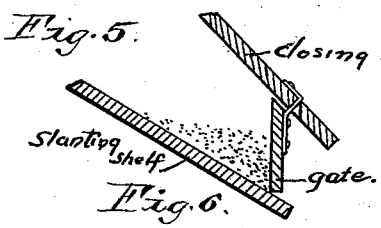
Fig. 6.
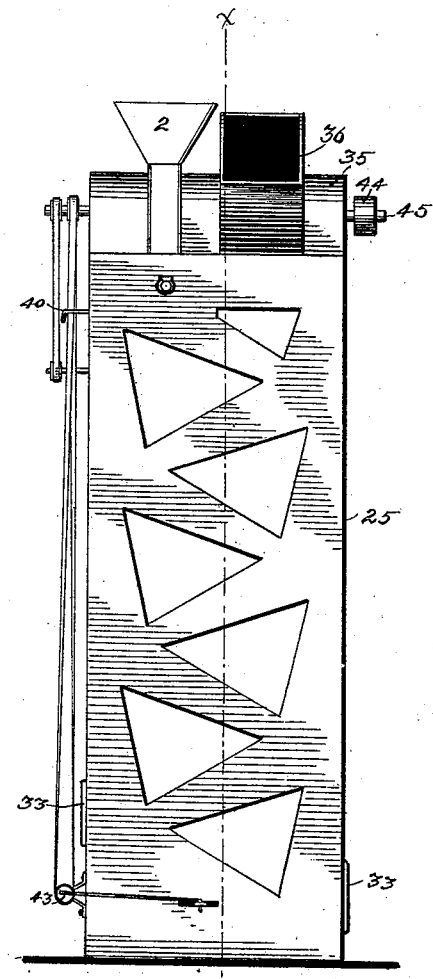
Fig. 4.
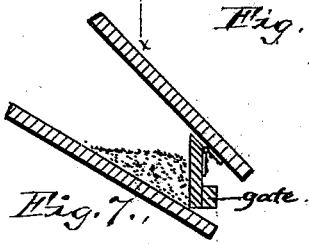
Fig. 7.
Witnesses:
C. E. Van Doren,
C. G. Hawley
Inventor:
Frank M. Shaw.
By Paul & Merwin Attys.
THE NORRIS PETERS CO., PHOTO-LITHO., WASHINGTON, D. C.

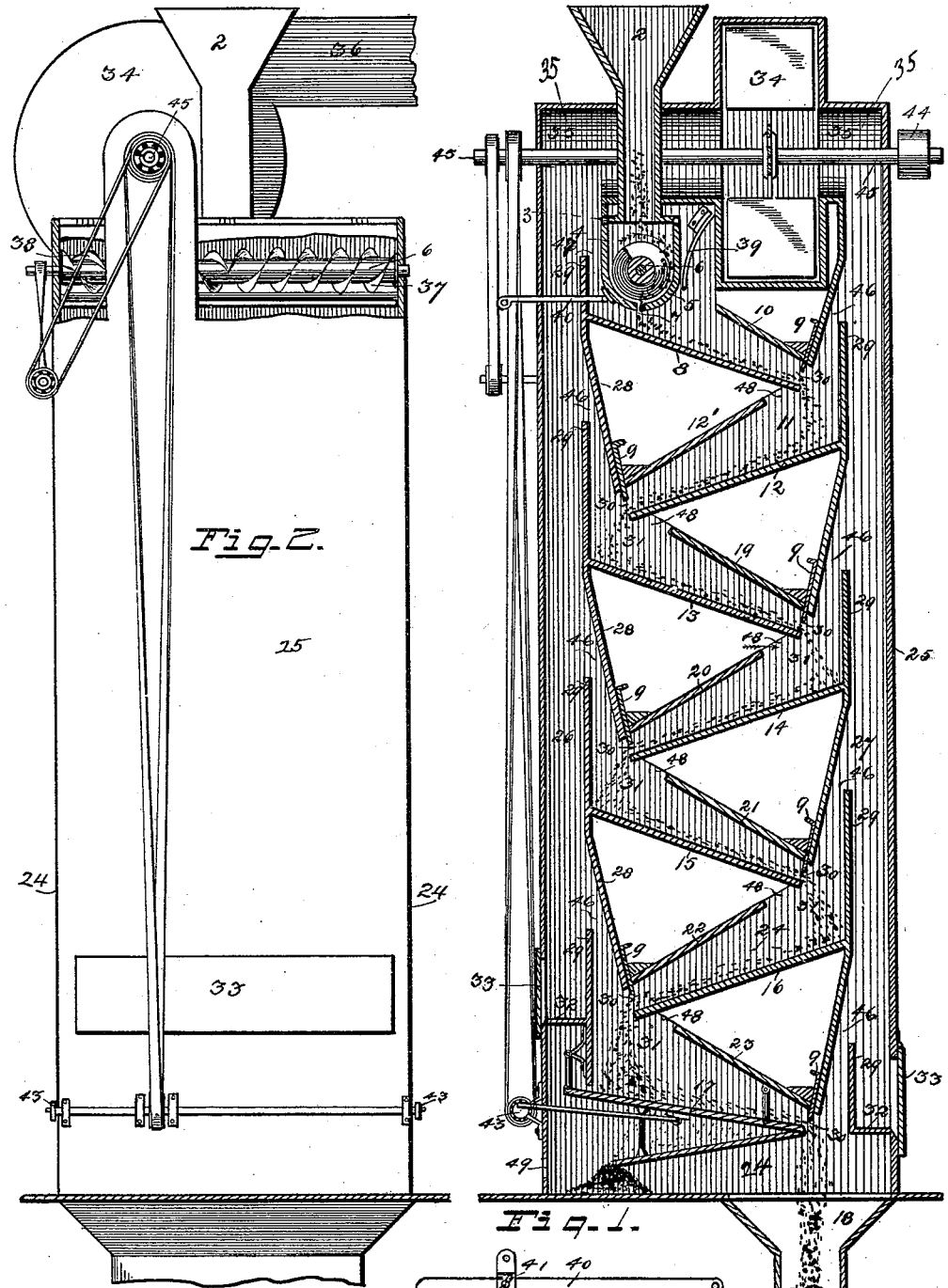

UNITED STATES PATENT OFFICE.

FRANK M. SHAW, OF MINNEAPOLIS, MINNESOTA.

GRAIN-CLEANER.

SPECIFICATION forming part of Letters Patent No. 450,198, dated April 14, 1891.

Application filed November 11, 1890. Serial No. 371,049. (No model.)

*To all whom it may concern:*

Be it known that I, FRANK M. SHAW, of Minneapolis, in the county of Hennepin and State of Minnesota, have invented certain Improvements in Grain-Cleaners, of which the following is a specification.

My invention relates to grain-cleaners or separators adapted for use in separating grain from the straw, dirt, and seeds which may be in the grain as it is originally delivered by the producer to the elevator or mill.

The object of my invention is to provide a grain-cleaner of a construction, such as to confine the machine to a minimum size in proportion to the work done, and in which the work of carrying off the foreign substances is accomplished by the use of strong suction air-currents through the various parts of the machine and through the grain as it falls from one part into another.

My invention consists in a series of slanting shelves arranged in alternately opposite positions one above the other, whereby the grain is given a zigzag course down through the machine, a second series of closing-in shelves or partitions arranged, respectively, over said slanting shelves and inclined at about the same angle, considerable space being left between the same, suitable air-trunks arranged on each side of the machine and having openings leading into the several chambers formed between the several shelves and partitions, openings arranged in the closing-in shelves or partitions beneath the lower ends or edges of said slanting shelves, and a suction device arranged in connection with said air-trunks, whereby a strong current of air is created through said openings and beneath the ends of the slanting shelves and through the thin stream of grain falling therefrom, by which the impurities are carried out of the grain and into the air-trunks.

My invention consists, further, in an automatic spreader and feeder especially adapted for use in connection with the other parts of my grain-cleaner, and in various details of construction, and in combinations hereinafter described, and particularly pointed out in the claims.

My invention will be more readily understood by reference to the accompanying drawings, in which—

Figure 1 is a transverse sectional elevation of a grain-cleaner embodying my invention. Fig. 2 is a side view thereof, the upper portion of the machine being shown cut away to more clearly show the automatic feeder and spreader. Fig. 3 shows two detail views of the adjusting-rod, by means of which the feed of the spreader is regulated. Fig. 4 is a full side view of my grain-cleaner. Fig. 5 is a vertical section on the line $x$ $x$ in Fig. 4. Figs. 6 and 7 show two ways of attaching the movable gates 9 to the closing-in shelves.

As shown in the drawings, the grain to be cleaned enters the top of the machine through the hopper and spout 2, passing through the top 3 of the feeder and spreader box.

As shown, the sides and bottom of the feed and spreader box are composed of the two curved metal plates 4 and 5, formed to correspond to the circular conveyer 6, provided within the box. The opening 7 is provided, as shown, between the lower edges of the plates 4 and 5, through which opening the grain falls in a thin wide stream upon the slanting shelf 8. From the shelf 8 the grain rolls or slides down under the adjustable slide or gate 9 provided in the partition 10 and falls over the lower edge of the shelf 8 into the chamber 11 formed between the second shelf 12 and the partition 13. From thence the grain passes down over the shelves 13, 14, 15, and 16 and upon the vibrating screen 17, where the small seed is separated from the good grain, after which the grain falls over the lower edge of the screen into the hopper. Partitions 19, 20, 21, 22, and 23 are provided above the several slanting shelves, forming with said shelves and the sides 24 of the machine closed chambers through which the grain is passed. The other sides 25 of the machine form the outer walls of the air-trunks 26 and 27. The inner sides 28 serve to close the direct opening from the outer air to the air-trunks. These sides are slanted, as shown, in order to make room for the deflecting-partitions 29, extending up a considerable distance beyond the openings 30 at the lower ends of the slanting shelves. It will be seen that the slanting shelves and their closing-in shelves or partitions do not lie parallel, but are so arranged as to leave a much larger opening in the upper part of each shelf-chamber 31 than at the lower end thereof. These portions may be made parallel with good results; but I preferably employ the construction shown as that in which the greatest space is left for the separation by the air-currents of impurities from the stream of grain as it falls over the lower edge of each slanting shelf. Very little room is needed in the bottom of the shelf-chamber, while all the room that can conveniently be obtained is required in the upper part of the same. The lower parts of the air-trunks are closed by partitions 29 and the floors 32 to prevent the waste substances which may fall into the bottom of the air-trunk from passing into the hopper 18. Openings are preferably left at the bottoms of the air-trunks 26 and 27, the same being normally closed by the swinging doors 33. A slide or adjustable gate 9 is provided at the lower end of each shelf, by means of which the flow of grain through the machine may be regulated, and more especially the grain kept from spraying as it falls from the shelf onto the top of the shelf below. By the use of these slides 9 the grain is quieted and projected over the edge of the shelf in a thin stream of an equal thickness clear across the whole width of the shelf, thereby insuring an even effect of the air-current on all parts of the grain. The slides 9 further serve to prevent the passage of air up through the shelf-chamber.

The suction-fan 34 is arranged in connection with the upper part of the machine, being directly connected with the tops of the air-trunks by the pipe or boxes 35 and having the outlet 36. The connections between the pipes 35 and the air-trunks is such as to allow an even draft throughout each air-trunk.

As shown in Fig. 2, the conveyer 6 is provided with the right-hand screw 37 and the left-hand screw 38, meeting at the middle of the conveyer-shaft at the point just beneath the mouth of the spout 2. It will thus be seen that the grain entering through the spout is immediately carried clear out to the ends of the feeder-box and spread evenly across the entire length thereof, thus securing a perfectly even flow of grain through the long opening or slot existing between the lower edges of the plates 4 and 5.

In connection with the plates 5, I provide the spring 39, adapted to normally hold the plate 5 in the position shown, but which will yield and allow the plate to move away from the conveyer in the case of a stick getting into the conveyer. In this way danger of breaking the flights of the feeder-conveyer is avoided, and the stick is carried around by the conveyer and allowed plenty of room through which to drop out of the feed-box.

I provide one or more rods or levers 40, in pivotal connection with the plate 4 and adapted to be locked against longitudinal movement. By pulling out or pushing in these rods it will be seen that the feed from the conveyer device may be readily regulated. I preferably employ thumb-screws 41, in connection with the retaining-straps 42, for locking the rods in position. Any other means—as, for instance, a notched rod—might, however, be employed. Any arrangement of the shafts, pulleys, and belting may be employed for driving the several revolving parts of the machine, the arrangement illustrated being merely one of many. The main driving-belt is preferably passed over the pulley 44 upon the exhaust-fan shaft 45.

In the practical use of the machine it is usual to provide separation-chambers in connection with each of the openings 46 and between the same and the direct passage into the air-trunks. This, however, is a feature common to most grain-cleaners, and it has been deemed unnecessary to illustrate the same. Suppose that the feeder and fan have been started up and that the grain has been let into the hopper and spout 2. The grain in the hopper will have in it considerable fine straw, many foreign seeds, and other impurities. As the thin stream of grain issues from the mouth of the feeder and falls upon the slanting shelf 8, a heavy current of air, entering through the opening 46, penetrates the stream and carries the light impurities out of the same and into the air-trunk through the narrow opening 47 between the partition 29 and the plate 4. From thence the light stuff is carried through a separation device, or, as illustrated, is drawn directly into the suction-fan with the air. The grain will roll or slide down the sliding-shelf 8, and, passing through the narrow opening or slot between the end of the shelf and the slide 9, falls into the chamber 11 upon the shelf 12. Meantime a strong current of air will be sucked through the opening 48 and through the grain to carry the impurities out of the same and through the opening 46 into the air-trunk 27, and from thence into the suction-fan. It will be seen that these holes 48, or rather "slots," as they may be called, are provided beneath the lower end of each slanting shelf between the upper end of each partition or closing-in shelf and the bottom of each slanting shelf. An opening 49 is left in the farther wall of the machine, through which air enters to supply the suction-current beneath the lower end of the sieve 17 to take out whatever foreign material still remains in the grain after it has passed through all of the upper parts of the machine. It will thus be seen that a large number of "suctions" are obtained in different parts of the machine, and that the grain is submitted to a thorough cleaning process, which is in each case applied evenly to every part of each falling stream of grain or material, and further, that the grain is put through the cleaning process and thoroughly cleansed within a machine occupying much less space than machines capable of an equal amount of work heretofore constructed.

It is obvious that various details in the machine might be modified without departing from the spirit of my invention, and I therefore do not confine myself to the exact construction herein shown and described.

Having thus described my invention, I claim as new and desire to secure by Letters Patent—

1. The combination, in a grain-cleaner, of the series of slanting shelves occupying alternately opposite positions one above the other with the walls of the machine, the closing-in shelves or partitions, openings arranged beneath the lower end of each of said slanting shelves, the inner walls and the vertical partitions 29, a suction-fan arranged in connection with the air-trunks formed between the outer walls of the machine and the inner walls thereof, and means whereby grain is spread evenly upon the upper slanting shelf, substantially as described.

2. The combination of three or more slanting shelves arranged in alternate positions one above the other with the walls of the machine, the closing-in shelves, the openings between the upper edges thereof and the under sides of the slanting shelves, and the suction-fan, substantially as described.

3. The combination, in a grain-cleaner, of three or more slanting shelves with the walls 24 and 25 of the machine, the closing-in shelves arranged above said slanting shelves, the air-trunk chambers 26 and 27, openings beneath the lower ends of each slanting shelf, openings leading from each shelf-chamber into the air-trunk, and a suction-fan arranged in connection with said air-trunks, substantially as described.

4. The combination, in a grain-cleaner, of the slanting shelves, three or more in number, arranged in opposite alternate positions, with the air-trunks 26 and 27, the shelf-chambers 31, the openings 48, the openings 46, the suction-fan arranged in connection with said air-trunk, means for feeding the grain evenly onto the upper slanting shelf, and adjustable means for maintaining said even feed throughout the machine and closing the air-passage between said shelves, substantially as and for the purpose specified.

5. The combination, in a grain-cleaner, of the slanting shelves with the closing-in shelves arranged substantially as described, the slides 9, the air-trunks 26 and 27, the shaking-screen 17, the openings 46, the openings 48, the suction-fan, the right and left hand screw conveyer 9, the plates 4 and 5, arranged about said conveyer, the openings 7 between the same, through which grain is admitted to the shelf 8, the spout 2, leading into the feeder-box formed by said plates, the plate 5, adapted to yield outwardly to extraordinary pressure from within, and means whereby the side or plate 4 may be adjusted in or out, substantially as and for the purpose specified.

6. The combination, in an automatic feeder, of the top 3, with the spout opening in the same, the sides 4 and 5, pivoted on said top 3, the spring 39, adapted to bear against the side 5, the rod or rods 40, attached to the side 4, and by means of which said side or plate 4 may be adjusted in or out to increase or decrease the size of the opening 7, and the conveyer 6, having the right and left hand screws adapted to spread the grain from the middle of the feed-box across the entire width thereof, substantially as and for the purpose specified.

7. The combination, in a grain-cleaner, of the slanting shelves with the closing-in shelves, the walls 24 and 25 of the machine, the walls 28, the partitions 29, the openings 46, the openings 48, the opening 47, the feeder or spreader device, and the suction-fan arranged in connection with the air-trunks, substantially as described.

8. The combination, with the slanting shelves and the closing-in shelves, of the side and end walls, the inlet-opening arranged beneath the lower edge of said slanting shelf, and a movable and adjustable gate provided in the opening between the lower ends of said shelves and adapted to spread the grain across the slanting shelf and to shut off the air-passage between said shelves, substantially as described.

In testimony whereof I have hereunto set my hand this 5th day of November, 1890.

FRANK M. SHAW.

In presence of—
 A. M. GASKILL,
 C. G. HAWLEY.